N. A. MORSE.
GAGE.
APPLICATION FILED JULY 15, 1910.
1,002,734.
Patented Sept. 5, 1911.
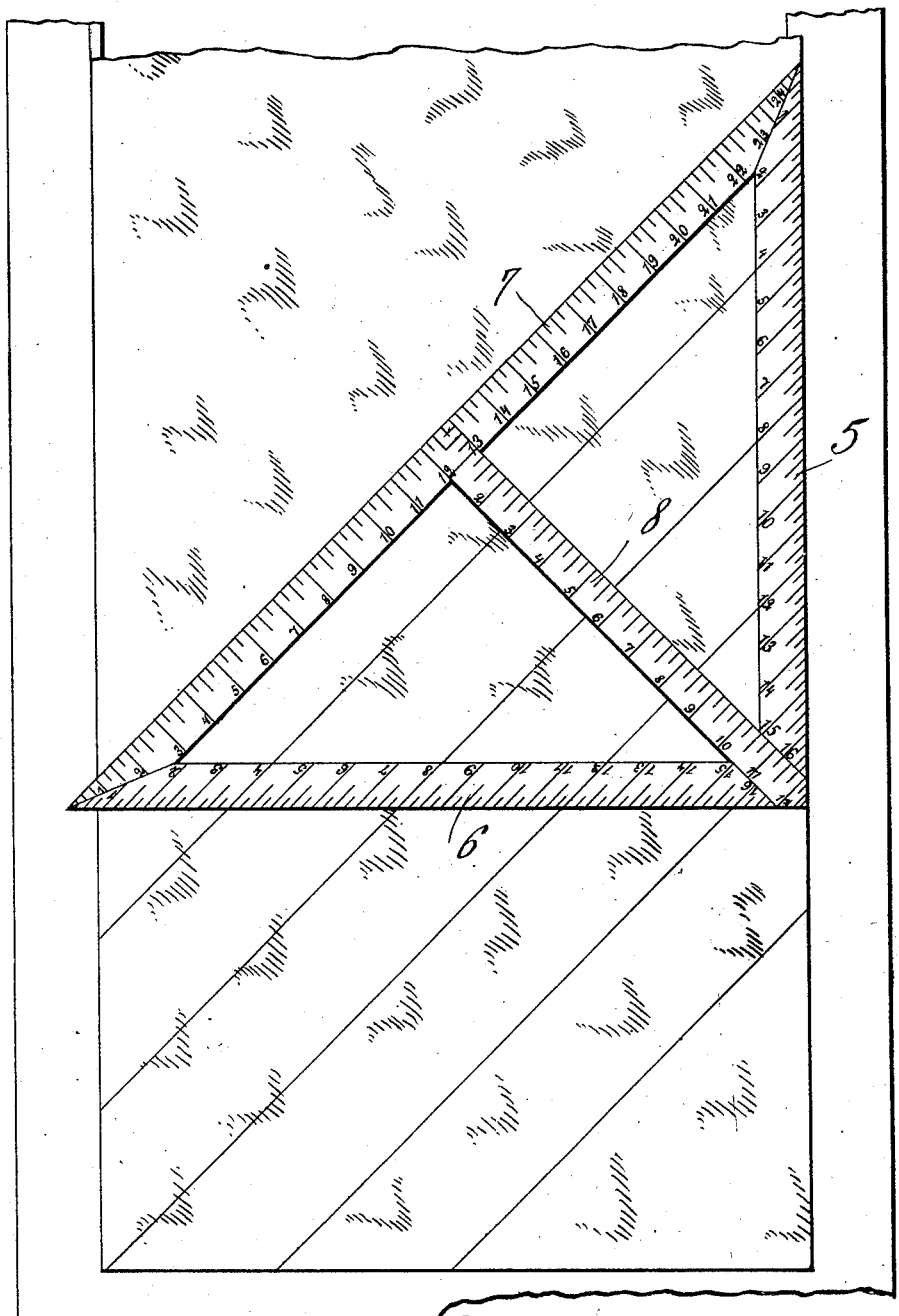

UNITED STATES PATENT OFFICE.

NORA A. MORSE, OF ABILENE, KANSAS.

GAGE.

1,002,734. Specification of Letters Patent. Patented Sept. 5, 1911.

Application filed July 15, 1910. Serial No. 572,207.

*To all whom it may concern:*

Be it known that I, NORA A. MORSE, a citizen of the United States, residing at Abilene, in the county of Abilene and State of Kansas, have invented a new and useful Gage, of which the following is a specification.

This invention relates to that class of gages which are used by dressmakers, milliners, and others for marking or cutting cloth or other material on a bias, a gage of this kind being disclosed in my Patent No. 738,224 dated September 8, 1903, and the present invention being an improvement thereon.

It is the object of the present invention to simplify the construction of the gage, and also to provide means whereby the exact width across the strip of cloth or other material may be accurately measured, and furthermore to provide a gage which can be used to obtain other accurate measurements.

With these objects in view, the invention consists in a novel construction and arrangement of parts to be hereinafter described and claimed, reference being had to the accompanying drawing, in which a plan view of the gage is shown illustrating the manner in which it is used.

Referring more particularly to the drawings, the gage comprises a triangular frame of wood or metal, said frame consisting of two arms 5 and 6, respectively, of equal length arranged at right angles to each other, and connected by a rigid diagonal arm 7. A cross arm 8 extends from the arm 7 to the meeting ends or corners of the arms 5 and 6, said cross arm extending perpendicularly to the arm 7.

Each of the herein described arms has inch graduations. The graduations of the arms 5 and 6 are placed obliquely so as to extend parallel to the arm 7, in view of which a line drawn between like graduations of said arms will be parallel to the arm 7. The graduations of the arms 7 and 8 are arranged at right angles to said arm in the ordinary manner.

In use, the gage is placed so that the edge of the arm 5 or the arm 6 coincides with the selvage or edge of the material. A line is then drawn on the material coinciding with the edge of the diagonal arm 7, this being the starting line. The gage is then turned entirely around, and the diagonal arm is positioned so that it is spaced from the starting line a distance corresponding to the desired width of the bias strip, this adjustment being readily effected by reason of the graduations of the arms 5 and 6. A second mark is now made along the diagonal edge, and the gage is then moved forwardly and readjusted for the next mark, and so on until the desired number of strips has been marked off.

The graduations of the cross arm 8 give the exact width directly across each strip, and the graduations of the arms 5 and 6 measure the straight edges of the strips at the same time. The diagonal arm gives the length of the strips.

The device herein described is very simple in construction, and by its use the cloth or other material can be rapidly and accurately marked, and the device may also be used with equal success in taking measurements for various other purposes. The cross arm 8 also serves to brace and strengthen the gage.

What is claimed is:

A gage comprising a triangular frame embodying two arms arranged at right angles to each other and a third diagonal arm connecting the terminals of the first named arms, the latter being provided with graduation marks disposed parallel with the diagonal member, and a fourth graduated arm connecting the apex of the angle with the diagonal arm.

In testimony that I claim the foregoing as my own, I have herto affixed my signature in the presence of two witnesses.

NORA A. MORSE.

Witnesses:
E. L. MORSE,
E. M. MORSE.